Aug. 5, 1969  A. JACOBS  3,459,411
FURNACE ARRANGEMENT AND METHOD
Filed April 8, 1966  3 Sheets-Sheet 1
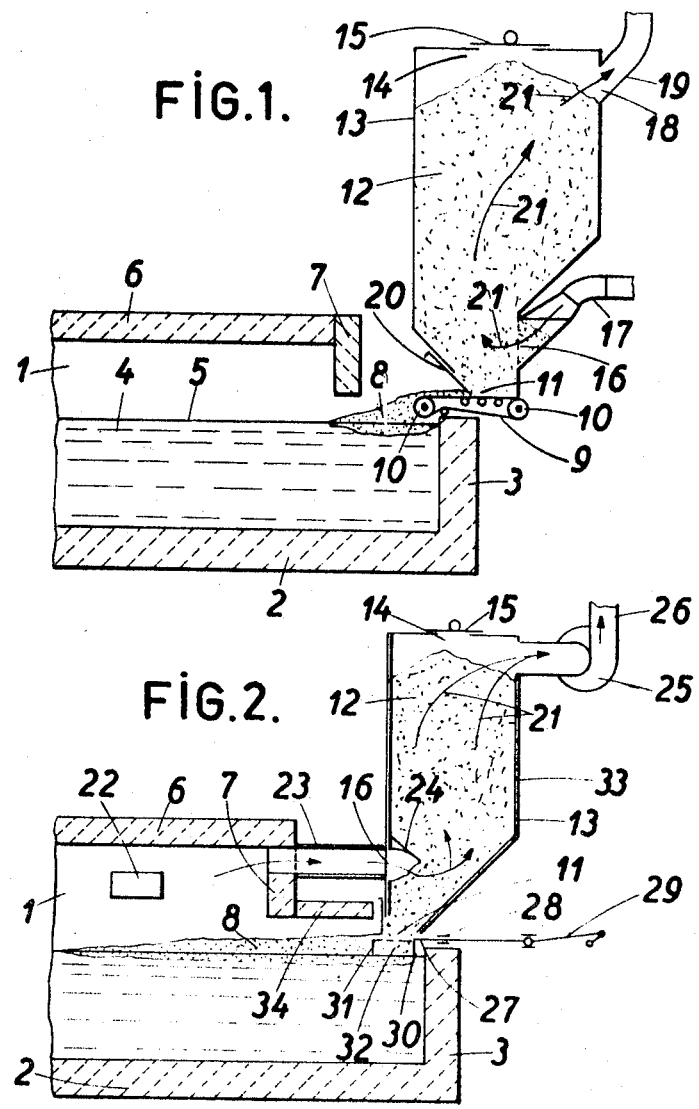
Inventor:
Alfred Jacobs
By: Spencer & Kaye
Attorneys Aug. 5, 1969  A. JACOBS  3,459,411
FURNACE ARRANGEMENT AND METHOD
Filed April 8, 1966  3 Sheets-Sheet 2

Inventor:
Alfred Jacobs
By: Spencer & Kaye
Attorneys

United States Patent Office 3,459,411
Patented Aug. 5, 1969

3,459,411
FURNACE ARRANGEMENT AND METHOD
Alfred Jacobs, Montignies-sur-Sambre, Belgium, assignor to Glaverbel S.A., Brussels, Belgium
Filed Apr. 8, 1966, Ser. No. 541,238
Claims priority, application Luxembourg, Sept. 14, 1965, 48,378
Int. Cl. F27d 3/18, 13/00, 3/10
U.S. Cl. 263—27                                                    21 Claims

ABSTRACT OF THE DISCLOSURE

A method and an arrangement for preheating and feeding loose solid material to a bath of molten material in a tank furnace, the loose solid material being preferably the ingredients for making glass and may include cullet. The materials to be preheated are in the form of a column where they descend without undergoing free fall but solely due to their own weight and in this manner they are transmitted to the glass furnace.

---

The present invention relates to tank furnaces and more particularly to a furnace arrangement wherein loose solid materials are preheated and fed to the furnace for melting therein and a method therefor.

The present invention will be described herein with reference to tank furnaces used for glass manufacturing. However, it should be noted that the present invention is not limited to such use and may be used whereever loose solid materials are to be fed into a tank in which such materials are melted. Furthermore, the expression "loose solid material" as used throughout the specification includes not only materials composed of individual pieces or individual particles, but also, material in which the individual pieces are composed of an agglomeration of particles, for example, agglomerates formed chemically and/or by subjecting quantities of granules to heat and pressure. It should also be noted that the loose solid material may comprise a single substance or a mixture of different substances.

In the manufacture of glass, glass can be, and is often made in tank furnaces without a preheating of the vitrifiable batch or composition. In such an arrangement, the heat produced in the tank must, therefore raise the temperature of the batch from room temperature to the required temperature of the bath in the melting zone. In order to achieve a more economic use of the relatively high grade fuels which must be used to provide the required temperature in the melting zone, various proposals have been made to preheat the batch by means of hot gases which have already yielded some of their heat at locations within the arrangement wherein higher temperatures are essential, or by burning fuel of a lower calorific value than that used for melting the batch. The preheating of the vitrifiable batch provides advantages in that not only does it promote fuel economy but it also makes possible a reduction in the size of the tank because the preheated batch may be more rapidly melted. The consequent reduction in the size and cost of the tank does not necessarily result in a reduction of the cost for the arrangement since there is the added expense of providing a preheating installation. However, this installation may be constructed from materials which are less expensive than those employed in the construction of the tank, and results in more economical production methods.

The following is a summary of several prior art arrangements for feeding a tank furnace with a preheated vitrifiable batch. However, it will become apparent that each of these arrangements has certain objectional and disadvantageous features which the present invention overcomes. According to one prior art arrangement, the batch is fed onto horizontal supports and is heated by hot gases which are conducted over the batch layers. However, this arrangement for preheating requires a large amount of space and the efficiency of the heat exchange is rather poor. Moreover, the design of the preheating installation is such that the mechanism required for feeding the preheated batch into the tank is relatively expensive.

Other prior art arrangements include a provision for heat exchange between the batch materials and the hot gases while the batch materials are in free fall. However, due to the speed at which the materials fall, the heat exchange is not satisfactory. Moreover, the batch constituents tend to become arranged according to size and specific gravity as they fall, and this is undesirable since it unfavorably affects the homogeneity of the glass.

Several prior art arrangements provide a heat exchange column for preheating in which the batch materials descend in a countercurrent flow with respect to the hot gasses. Although this type of arrangement provides an efficient heat exchange in a satisfactory manner, such arrangements do not provide acceptable feeding means for feeding the pre-heated batch into the molten bath. For example, it has been proposed to install a preheating column which opens directly into the bath so that the batch descends in the column as the materials at the bottom thereof become melted. However, this proposal is not practicable since it is, in practice, impossible to properly regulate the batch feed so as to consistently maintain the proper level of the bath in the tank which is normally essential for the satisfactory working of the glass forming machine or machines to which the molten glass is fed, and which level is also essential for preventing damage to the vertical tank walls.

Other prior art proposals have been made for using a heat exchange column which is separated from the melting tank. However, this type of arrangement also has disadvantageous features. For example, such an arrangement requires successive operations including the discharge of the preheated batch from the column, the collecting of the preheated batch, and the conveying of the batch up to and into the tank. The various mechanical devices necessary for these operations are expensive an require additional maintenance which results in and uneconomical operation. In addition, with such an arrangement there would be considerable heat losses during the handling of the preheated batch, and its constituent materials would suffer appreciable segregation or, in the case of agglomerates, disintegration.

It is therefore an object of the invention to overcome the above-noted defects of the prior art.

It is another object of the present invention to provide a method for preheating and feeding loose solid material to a bath of molten material in a tank furnace, which method overcomes the disadvantages of the prior art.

It is a further object of the present invention to provide a preheating arrangement for loose solid material and feeding means for discharging the loose solid material in a preheated condition to a bath of molten material in a tank furnace.

These objects and others ancillary thereto are accomplished according to the preferred embodiments of the present invention wherein a hot gaseous medium is passed through a chamber containing the material to be preheated and a discharge device is regulated in a manner such that operation thereof releases material from the bottom of the chamber and causes feed of the discharged material directly to the surface of the bath of molten material within the tank furnace with substantially no free fall of the material or without appreciable free fall thereof.

In accordance with the present invention, there is provided an arrangement including a tank furnace, means for preheating a material, and means for feeding such preheated material into the tank. Such an arrangement includes a chamber for retaining a mass of loose solid material and having a discharge opening at the bottom thereof, means for conducting hot gas into such chamber for heating its contents, and a control device for causing the release of the material from the bottom of the chamber. The control device also serves for feeding the material directly and with at most a small amount of free fall to a delivery point or points located within the tank furnace, such points being located at or near the level at which the bath of molten material is to be maintained.

In accordance with a feature of the present invention, the control device may actually convey the released preheated material to the bath surface or to a discharge point near to such surface. By regulating the control device, e.g., its speed of operation, the volume of material discharged from the chamber and the feed of the material to the bath per unit time can easily be adjusted to match the rate of discharge of molten material from the tank. For example, the control device may comprise an endless conveyor belt, the upper portion thereof being movable under the bottom discharge opening of the heat exchanger. It may also comprise an inclined chute on which the material on the lower end of the heat exchanger rests and which chute is vibrated to cause control descent of the material along the chute. In the case of an endless belt, the rate of discharge and feed of material may be regulated by regulating the speed of the belt, or, if the belt is only intermittently rotated, by regulating the frequency of the belt motion. In the case of a vibrating chute, the discharge and feed can be controlled by varying the amplitude of the vibration. In addition, the control device may also comprise other suitable arrangements such as a pushing mechanism and a roller device.

According to another feature of the present invention, the heat exchanger, which is in the form of a heat exchange column which can be charged with solid material through the top thereof, preferably comprises an inner compartment for the loose solid material and one or more compartments into which the hot gases can be introduced, the wall of the inner compartment having apertures to allow the gases to flow transversely therethrough.

Additional objects and advantages of the present invention will become apparent upon consideration of the following description when taken in conjunction with the accompanying drawings in which:

FIGURE 1 is a schematic, cross-sectional view of a furnace arrangement including a tank furnace and a feed mechanism therefor according to the present invention.

FIGURE 2 is a schematic, cross-sectional view of another embodiment of a furnace arrangement constructed in accordance with the present invention.

Figure 3:
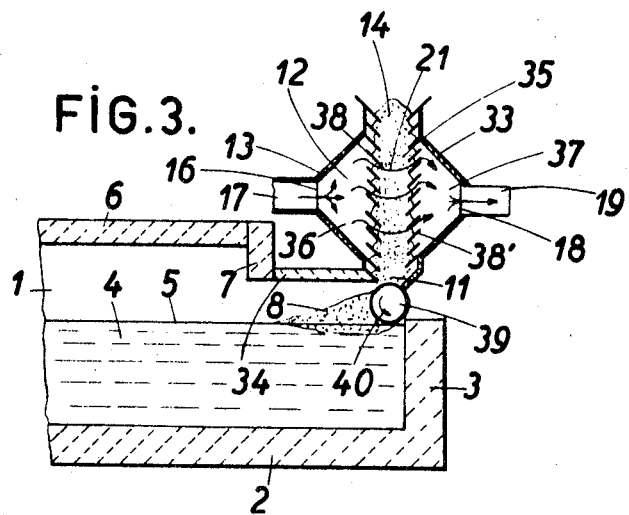
FIGURE 3 is a schematic, cross-sectional view of a further embodiment of a furnace arrangement constructed in accordance with the present invention.

Referring now to the drawings, there is shown in FIGURE 1 a glass-melting tank furnace 1 having a base member 2, two side walls, and two end walls including a feed end wall 3. As shown, the tank contains a molten glass bath 4 having a surface level which is designated as 5. The tank is covered over approximately its whole surface by a crown 6 having an end wall 7.

The preheating and feed arrangement for the tank furnace includes a heat exchanger 12 positioned above the feed end of the tank and having a casing 13 in the form of a hopper. The heat exchanger is provided with an open top portion 14 through which the vitrifiable material is charged into the heat exchanger and which portion is closed by a cover 15. The heat exchanger is also provided with a gas inlet opening 16 having connected thereto an inlet pipe 17, and an outlet opening 18 having an outlet pipe 19 connected thereto and through which the cooled gases escape to the atmosphere. The bottom of the heat exchanger is provided with a discharge opening 11, the size of which can be adjusted by a sliding panel 20. An endless metal conveyor belt 9, supported by two water-cooled drums 10 is mounted directly below the opening, almost entirely obstructing the opening, and arranged for conveying the discharged material over the end wall 3 and into the molten glass bath whereby the material forms a bed 8 which is partially immersed in the molten glass.

As shown in FIGURE 1, the operation of the arrangement is such that when the heat exchanger 12 is filled with a vitrifiable batch through the top portion 14, the batch is prevented from discharging at the bottom by the belt 9. The batch is heated by hot gases which flow through the batch as indicated by the arrows 21. The preheated batch is then supplied into the melting end of the tank 1 when desired, by rotating the belt 9 by means of a motor, not shown. The preheated batch moves forward on the belt and discharges from the belt onto the bed 8 floating on the molten glass 4 and therefore, the distance through which the batch material falls from the belt is negligible. Thus, since the belt 9 controls the quantity of the vitrifiable batch discharged from the heat exchanger per unit time and also the quantity of the preheated batch deposited on the bed 8, these quantities may be regulated by varying the speed of the motor for the belt.

As the preheated bottom strata of the batch materials is discharged from the heat exchanger, the mass of material in the exchanger descends under the force of gravity. Accordingly, during this movement, the pieces of material constituting the charge in the heat exchanger receive relative displacement and thereby prevent the clogging of the inter-granular spaces traversed by the hot gases. It should be noted that the hot gases can be produced by burning of fuel or lower quality than that used for heating the tank furnace or the preheating gases may be constituted by hot effluent gases which would otherwise be wasted, e.g., the exhaust gases from the tank furnace which have been previously used for preheating the combustion air for the furnace.

In FIGURE 2, there is shown another embodiment according to the present invention with burners 22 for the combustion of fuel for the furnace being schematically illustrated. According to this embodiment, the hot gases used for preheating the batch are the exhaust gases resulting from the combustion of fuel. A pipe 23 connects the end wall 7 and the heat exchanger 12 for conducting the combustion gases into the heat exchanger. As shown, the heat exchanger is provided with a baffle plate 24 at the inlet opening 16 for the pipe 23 and a blower 25 is arranged at the outlet of the heat exchanger and connects with an exhaust pipe 26. As the gases from the furnace enter the heat exchanger, they are deflected downwardly by the baffle plate over the inlet opening 16 so that the gases pass through the materials at the lower end of the exchanger. The gases are then drawn upwardly through the mass of solid materials by the blower 25 and are discharged through the exhaust pipe 26. As further shown in FIGURE 2, the metal casing 13 of the heat exchanger is covered by heat-insulating material 33 and a wall 34 is provided above the melting end of the furnace between the end wall 7 and the heat exchanger 12 so as to afford further protection for the heat exchanger from heat radiation.

According to this embodiment of the present invention, the device for controlling the discharge from the heat exchanger and the feed of the discharge material to the bath may be formed of one or more members mounted for reciprocal movement beneath the heat exchanger so that when the device is moved in one direction, a quantity of material is released from the exchanger, and when the device is moved in the other direction, the released material is advanced onto the bath. As shown, the bottom discharge opening 11 of the heat exchanger is normally obstructed by a horizontal panel 27 forming one member of a reciprocating control device, the panel being reciprocally moved within horizontal guides 28 by a crank mechanism 29. The front end of the panel 27 is provided with a vertical pushing wall 30 such that when the device is in the retracted position, shown in solid line, the opening 11 is not obstructed and material is discharged therefrom to fill an area designated as 32. When the panel 27 is moved forward on the forward stroke of the crank mechanism, the wall 30 forces the material positioned in the area 32 forward, along the bath surface to form a floating bed 8 of the vitrifiable batch. In the forward position of the device, which is shown in broken lines, the wall 30 is in the position 31 and thereby the panel 27 closes the discharge opening. The reciprocating device preferably operates within the tank at or immediately above the surface level of the bath so that the preheated material is released directly onto the bath surface and is pushed along such surface, with the rate of discharge and feed being controlled by the rate of reciprocation of the device.

In FIGURE 3 there is shown another arrangement according to the present invention wherein the heat exchanger 12 is provided with an inner vertical compartment 35 for receiving a column of the vitrifiable batch materials to be melted, a compartment 36 into which the hot gases are admitted, and a compartment 37 from which the cool gases are exhausted. The two compartments 36 and 37 are separated by the inner compartment 35, this compartment having walls 38 and 38' and each formed by a vertical row of rectangular inclined plates which extend between and are supported by parallel front and back walls (not shown) of the casing 13. Thus, the walls of the inner compartment are apertured to allow the gases to flow transversely therethrough. The apertured walls must be formed so that the loose solid material will not discharge therethrough and therefore as shown in FIGURE 3, a very suitable construction is one in which the openings in the walls of the inner chamber are located between baffle plates which are inclined downwardly and inwardly so as to direct the solid material away from the openings as the material descends under the force of gravity. The inclined plates provide a series of supports for the solid material at intervals over the entire height of the heat exchanger so that the pressure within the solid mass is less than it would be otherwise and the mass is consequently more permeable to the gases. The construction of the heat exchanger so that the heating gases can flow through the solid mass in this manner, has the advantage of offering a large flow path for the gases per unit volume of the material and the gas can easily be given access of the greater part or virtually the entire surface area of the individual pieces or particles.

As shown, the loose solid material in the central column forms on each of the incline plates a natural slope which does not reach the outer edges of the plates. The hot gases pass between the plates and the pressure required to cause the gas to flow through the mass of the solid material is negligible as compared with the pressure which would be necessary to cause the gas to flow upwardly through a column of the material of comparable height. Also, the total pressure drop of the gases is small because the thickness of the loose solid material through which the gases pass is small and because the solid pieces are not fully settled due to the series of supports afforded by the inclined plates. Moreover, the pressure does not appreciably increase with the depth of the materials in the column and the pressure drop remains substantially constant over the preheating cycle because the mass of grains or particles does not become more compacted as the mass descends with the grains becoming rearranged. Since the walls 38 and 38' are parallel, the pressure drop is uniformly distributed over the entire height of the column with the gas flow also being uniformly distributed.

Although a uniform gas flow has been described, it should be noted that it is also possible to construct a column wherein the spacing of the walls varies over its height in order to achieve a predetermined nonuniform distribution of the gas flow. For example, a nonuniform flow may be desired in order to heat the materials to be melted either more quickly or more slowly within a predetermined temperature range. Accordingly, by appropriately selecting the distance between the walls 38 and 38', and the inclination of the plates, a non-uniform distribution may be attained and such a heat exchanger may be used for heating widely differing materials, and particularly granules of a vitrifiable batch and a cullet of various forms and sizes. In fact, this type of heat exchanger has already been found to be suitable for such materials. A heat exchanger can also be constructed so that the spacing of the walls 38 and 38', and also the inclination of the plates, can be varied. For example, the plates can be pivotably mounted on frames which are horizontally slidable so as to provide the variable effect. On the other hand, the absence of moving parts is an advantage from the point of view of simplicity of construction and because materials which are difficult to work or which are relatively fragile can be used in the construction, e.g., refractory ceramics and various kinds of heat-insulating materials.

The operation of the heat exchanger according to the present invention is such that the speed of the gas flow is relatively low and therefore there is only a small amount of dust carried by the gas, this dust tends to settle in the chamber 37 where the gas flows slow down, so that the dust can be recovered from the bottom of the heat exchanger. The upward and lower ends of the chamber may be provided with hatches formed by spaced plates so that the part of the heating column through which the heating gas is passed is not in communication or in direct communication with the top opening 14 or the discharge opening 11, so that the escape of gas and entry of air from and to the column is prevented, even during the supply of material into the top of the column and the discharge of preheated material from the bottom.

In the arrangement shown in FIGURE 3, beneath the discharge opening 11 there is provided a control device for controlling the discharge and the feed of the vitrifiable batch. In this embodiment, the control device comprises a water-cooled roller 39 which is driven in the direction of the arrow 40 by a motor, not shown. The roller is provided with a rough surface for aiding the discharge and feed of the batch and, by varying the speed of rotation, the rate of discharge and feed for the preheated material may be regulated.

Figure 4:
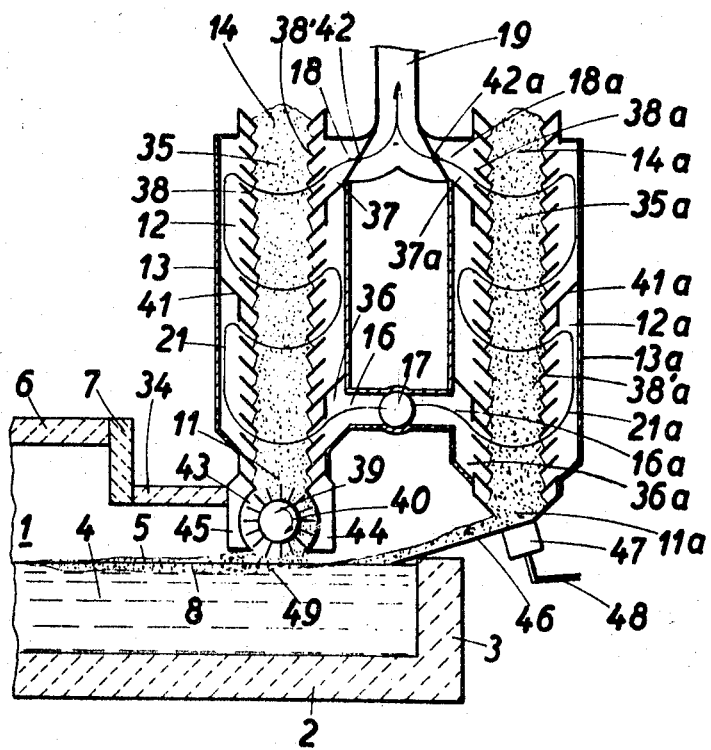
FIGURE 4 is a schematic, cross-sectional view of still another embodiment of the furnace arrangement according to the present invention wherein the preheating arrangement includes two chambers.

In FIGURE 4 there is shown a further embodiment of the present invention wherein the furnace is provided with a heat exchanger 12 for preheating a vitrifiable batch, and a heat exchanger 12a for preheating cullet, the walls of each of the heat exchangers being insulated by refractory ceramic material. Each of the heat exchangers is similar to the heat exchanger shown in FIGURE 3, but with the gas chamber of each heat exchanger being subdivided by inclined internal partitions 41 and 41a placed alternately on opposite sides of a central column 35 and 35a of the respective heat exchanger. Thus, the hot gases must pass several times through the respective column for the heat exchanger as indicated by the arrows 21 and 21a. A supply pipe 17 for the hot gases is connected to gas inlets 16 and 16a of the heat exchangers and the heat exchangers are provided with a common gas discharge pipe 19 at the top thereof. Gas outlets 18 and 18a, respectively, are each connected to the pipe 19 with the distribution of gases between the two heat exchangers being regulated by butterfly valves 42 and 42a provided in the respective gas outlet. The efficiency of this embodiment is particularly high due to the fact that the hot gases entering the heat exchangers first encounter the hottest grains near the bottom of the columns and then the gases traverse the upper portions of the column with progressively lower temperatures. It is also possible to improve the efficiency of such a system by combining several individual heat exchangers such as those shown in FIGURE 3.

If it is desired to preheat the materials in different heat exchangers to different temperatures, e.g., to preheat the cullet to a temperature below the temperature of the vitrifiable batch, the heat exchangers may be arranged in series connection. Thus, referring to FIGURE 4, the heat exchangers could be arranged with the gas inlet 16a of the heat exchanger 12a being connected to the gas outlet 18 of the heat exchanger 12, the openings 16 and 18a being respectively connected to the pipes 17 and 19.

The heat exchanger 12 which is used for preheating the vitrifiable batch is provided with a control device in the form of a roller 39 having radial fins 43, with the roller being rotated at variable speeds in the direction of the arrow 40 between two curved walls 44 and 45. The roller may be located just above the bath level and the provision of fins results in easier and more positive displacement of the material from the bottom of the heat exchanger and also better control of the descent of the material to the bath. Moreover, such fins enable the roller, if suitably placed, to advance a floating bed of the material along the bath surface. Thus, the preheated materials enter at a controlled rate between the roller 39, the fins 43 and the wall 44, and are deposited as a bed 8 of regular thickness which is then pushed forward towards the melting zone by the fins 43. When the rotating roller is used as a discharge control member and is located in the melting tank, it is advantageous to provide a retaining wall adjacent to the periphery of the roller to assist in retaining the material on the roller until the material is at a position on or near the bath surface. Accordingly, the wall 44 may be dispensed with although it is very advantageous because it hinders the vitrifiable batch from falling before it reaches the level of the bed 8. Also, a guard wall can be provided which serves the additional purpose of protecting the roller against heat radiation and for enclosing the discharge zone beneath the heat exchanger so that gases introduced in the heat exchanger can not flow into the tank. As shown, the wall 45 serves as the guard wall to protect the roller 39 against the radiation from the melting zone while the walls 44 and 45 form, with the roller 39, a lock which reduces the passage of gas therethrough.

The heat exchanger 12a which is used for preheating the cullet is provided with a discharge opening 11a which is partially obstructed by an inclined wall 46 to which a water-cooled vibrator 47 is connected, such vibrator having a source of electric power attached thereto through conductor leads 48. When the wall is stationary, it prevents the cullet from flowing out of the bottom of the heat exchanger. However, when the wall 46 is vibrated, the cullet is discharged from the opening 11a and flows down the wall 46. The amount of cullet feeding onto the bath can be regulated by varying the amplitude of the vibrations and thus a thin layer 49 of the cullet is laid on the surface of the bath and spreads out on the molten glass and is carried by the bed 8 of the vitrifiable material which is deposited on the cullet layer.

Thus, the quantity of hot gases supplied to the heat exchangers per unit time can advantageously be adjusted so that it is proportionate to the quantity of materials to be heated within a predetermined period of time such that the materials feed into the bath at a substantially constant temperature. For this purpose, it is necessary to provide means as described above for controlling the ratio between the quantities in order to adjust the temperature and for adapting the temperature to variations in the operational conditions.

Accordingly, as is readily apparent from the above description, the present invention provides several advantageous features, including that of no objectional free fall of the material during the heat exchange process or during the subsequent conveyance of the material to the bath. Furthermore, material leaving the heat exchanger can be fed to the bath in a very short time so that heat losses are very low or even negligible and both the discharge of the preheated material from the heat exchanger and the feed of such material to the bath are automatically coordinated since they are controlled by a common control system. Thus, the control system eliminates an accumulation of preheated material awaiting feed to the bath.

With regard to the rapid introduction of preheated material into the bath following the discharge of the material from the heat exchanger, it should be noted that the actual lapse of time depends on the distance between the heat exchanger and the bath and the speed at which the material moves or is moved to the bath. However, there is no problem in arranging the heat exchanger close to the bath and, in fact, the bottom of the heat exchanger may actually open into the tank itself so that the preheated material is at or near the bath surface when it is released by the discharge control device.

It should also be noted that with the present invention, widely different types of material may be used and as pointed out above, in glass manufacture, a cullet may be preheated and fed as a bottom layer onto the bath surface with the preheated pulverized or agglomerated vitrifiable batch being fed onto the cullet to form a superimposed layer. It should again be noted that although the invention has been described with reference to glass manufacturing it is not limited thereto.

It will be understood that the above description of the present invention is susceptible to various modifications, changes, and adaptations.

What is claimed is:

1. A method for preheating and feeding loose solid material to a bath of molten material within a tank furnace, comprising the steps of:

forming a column of loose solid material in a chamber;

passing a hot gaseous medium through the column of material in the chamber for preheating such material; and simultaneously and in a single step discharging the preheated material from the chamber and directly feeding the same onto the surface of the bath of molten material in the tank furnace and causing the material in the column to descend due solely to its own weight and the removal of material from below so that the discharged material is fed to the surface of the bath with at most a small amount of free fall.

2. The method as defined in claim 1 wherein the discharged material is fed to the surface of the bath with no free fall.

3. The method as defined in claim 1 wherein the bath of molten material is constituted by molten glass and the material to be preheated is constituted by a vitrifiable batch.

4. The method as defined in claim 1 comprising regulating the rate of flow of the material to the surface of the bath and by so doing regulating the rate of descent of material in the column.

5. The method as defined in claim 1 wherein the hot gaseous medium is constituted by exhaust gases from the tank furnace subsequent to their being used for preheating the combustion air for the furnace.

6. An arrangement for preheating and feeding material into a tank furnace which contains a bath of molten material, comprising, in combination:

a tank furnace having a delivery area at approximately the level at which the surface of the bath of molten material is to be maintained;

means defining a chamber for containing a column of loose solid material, said chamber means having a discharge opening at the bottom thereof;

means for conducting hot gas into said chamber means for heating the contents thereof; and control means disposed solely under said opening and immediately above the bath surface level for discharging material from said discharge opening and thereby selectively controlling the descent of material in the column and for directly feeding the discharge material with essentially no free fall to the delivery area within the tank furnace.

7. An arrangement as defined in claim 5 wherein the bottom of said chamber means is positioned over a portion of the tank furnace.

8. An arrangement as defined in claim 5 wherein the bottom of said chamber means is positioned exteriorly of the region enclosed by the tank furnace.

9. An arrangement as defined in claim 5 wherein said control means is arranged for conveying the preheated material from the bottom of said chamber means to the delivery area.

10. An arrangement as defined in claim 9 wherein said control means comprises an endless conveyor belt.

11. An arrangement as defied in claim 9 wherein said control means comprises a vibratory chute.

12. An arrangement as defined in claim 9 wherein said control means comprises a roller positioned at the bottom of said chamber means and mounted for rotation about its horizontal axis.

13. An arrangement as defined in claim 12 wherein said roller is provided with a roughened surface.

14. An arrangement as defined in claim 12 wherein said roller is provided with projecting fins at the surface thereof.

15. An arrangement as defined in claim 14 and further comprising wall means provided adjacent said roller for aiding in retaining the loose material between the fins of said roller.

16. A method for preheating and feeding loose solid material to a bath of molten material within a tank furnace, comprising the steps of:

passing a hot gaseous medium through a chamber containing material for preheating such material;

simultaneously discharging the preheated material from the chamber and directly feeding the same onto the surface of the bath of molten material in the tank furnace, whereby the discharged material is fed to the bath with at most a small amount of free fall; and passing a hot gaseous medium through a separate chamber containing a cullet to be preheated, and simultaneously discharging and directly feeding the preheated cullet onto the surface of a bath of molten glass.

17. The method defined in claim 16 wherein the material is fed to the surface of the bath on top of the cullet.

18. An arrangement for preheating and feeding material into a tank furnace which contains a bath of molten material, comprising, in combination:

a tank furnace having a delivery area at approximately the level at which the surface of the bath of molten material is to be maintained;

means defining a chamber for containing a mass of loose solid material, said chamber means having a discharge opening at the bottom thereof;

means for conducting hot gas into said chamber means for heating the contents thereof;

control means for discharging material from said discharge opening and for directly feeding the discharge material with essentially no free fall to the delivery area within the tank furnace; and said means defining a chamber further defining an inner compartment for receiving the loose solid material and at least one outer compartment for receiving hot gases, said inner compartment being formed with walls having apertures therethrough for permitting the gases from said outer compartment to flow transversely through said inner compartment.

19. An arrangement as defined in claim 18 wherein said outer compartment is provided with internal partitions arranged such that gas entering said outer compartment is constrained to pass at least twice through the mass of solid material before reaching a gas outlet.

20. An arrangement as defined in claim 18 wherein said walls of said inner compartment are provided with baffle plate means which are inclined downwardly and inwardly and which have the apertures in said walls of said inner compartment located therebetween, said baffle plates providing a series of supports for the solid material at intervals over the height of said chamber means.

21. An arrangement for preheating and feeding material into a tank furnace which contains a bath of molten material, comprising in combination:

a tank furnace having a delivery area at approximately the level at which the surface of the bath of molten material is to be maintained;

means defining a chamber for containing a mass of loose solid material, said chamber means having a discharge opening at the bottom thereof;

means for conducting hot gas into said chamber means for heating the contents thereof;

control means for discharging material from said discharge opening and for directly feeding the discharge material with essentially no free fall to the delivery area within the tank furnace; and said chamber means together with said conducting means and said control means forming a preheating and feeding unit and further comprising at least another of said units for preheating and feeding material into a tank furnace, each of said units including means defining a chamber and a control means associated therewith for discharging the material and directly feeding the discharged material with essentially no free fall to the delivery area within the tank furnace which is located at approximately the level at which the surface of the bath of molten glass is to be maintained.

References Cited

UNITED STATES PATENTS

| | | | |
|---|---|---|---|
| 923,478 | 6/1909 | Artman | 263—40 |
| 1,815,890 | 7/1931 | Brockway | 263—27 |
| 2,284,398 | 5/1942 | Kutchka | 65—335 X |
| 3,077,273 | 2/1963 | Zellers | 65—335 X |
| 3,172,648 | 3/1965 | Brichard | 65—335 X |

JOHN J. CAMBY, Primary Examiner

U.S. Cl. X.R.

263—40

PO-1050
(5/69)

UNITED STATES PATENT OFFICE
CERTIFICATE OF CORRECTION

Patent No. 3,459,411              Dated August 5th, 1969

Inventor(s) Alfred Jacobs

It is certified that error appears in the above-identified patent and that said Letters Patent are hereby corrected as shown below:

Column 1, line 6, change "Sept. 14" to --April 12--. Column 5, line 55, change "of" to --to--. Column 9, line 12, change "5" to --6--; line 15, change "5" to --6--; line 18, change "5" to --6--; line 47, after "fed to" insert --the surface of--.

SIGNED AND
SEALED
JAN 20 1970

(SEAL)
Attest:

Edward M. Fletcher, Jr.
Attesting Officer

WILLIAM E. SCHUYLER, JR.
Commissioner of Patents